US009043151B2

(12) United States Patent
Cai et al.

(10) Patent No.: US 9,043,151 B2
(45) Date of Patent: May 26, 2015

(54) LARGE SCALE DEMAND RESPONSIVE TRANSIT FRAMEWORK

(71) Applicants: Danqing Cai, Singapore (SG); Ziheng Lin, Singapore (SG); Kar Leong Tew, Singapore (SG); Elliot Chiam, Singapore (SG); Sak Onn Lee, Singapore (SG)

(72) Inventors: Danqing Cai, Singapore (SG); Ziheng Lin, Singapore (SG); Kar Leong Tew, Singapore (SG); Elliot Chiam, Singapore (SG); Sak Onn Lee, Singapore (SG)

(73) Assignee: SAP SE (DE)

( * ) Notice: Subject to any disclaimer, the term of this patent is extended or adjusted under 35 U.S.C. 154(b) by 0 days.

(21) Appl. No.: 14/044,874

(22) Filed: Oct. 3, 2013

(65) Prior Publication Data

US 2015/0100238 A1    Apr. 9, 2015

(51) Int. Cl.
*G01C 21/34* (2006.01)
*G06Q 10/00* (2012.01)

(52) U.S. Cl.
CPC ....................................... *G01C 21/34* (2013.01)

(58) Field of Classification Search
USPC .......................................... 701/537; 705/7.39
See application file for complete search history.

(56) References Cited

U.S. PATENT DOCUMENTS

| 7,979,292 | B2* | 7/2011 | Hamilton et al. | 705/5 |
| 8,289,845 | B1* | 10/2012 | Baldonado et al. | 370/230 |
| 2008/0027772 | A1* | 1/2008 | Gernega et al. | 705/7 |
| 2010/0153192 | A1* | 6/2010 | Hamilton et al. | 705/13 |
| 2011/0255553 | A1* | 10/2011 | Bobba et al. | 370/429 |
| 2013/0046586 | A1* | 2/2013 | Lerner et al. | 705/7.39 |

OTHER PUBLICATIONS

Wikipedia, Demand responsive transport, http://en.wikipedia.org/wiki/Demand_responsive_transport, Sep. 26, 2013.
3iBS, About 3iBs, http://www.3ibs.eu/en/home, UITP, International Association for Public Transport, Copyright 2013.
Stephen Dowling, Radically rethinking the bus system, http://www.bbc.com/future/story/20130327-new-bus-stop-for-flexible, Imagineering (/Future/Columns/Imagineering), Mar. 28, 2013, BBC (British Broadcasting Corporation).
Keith Dierkx, The Smarter Railroad, IBM Global Business Services, Mar. 2009, pp. 1-15, IBM Corporation, United States of America.
Robin Chou, NYC Live Bus, http://2013mtaappquest.challengepost.com/submissions/15310-nyc-live-bus, Copyright 2013.

* cited by examiner

*Primary Examiner* — Thomas G Black
*Assistant Examiner* — Tyler Paige
(74) *Attorney, Agent, or Firm* — Horizon IP Pte. Ltd.

(57) ABSTRACT

Described herein is a descriptive framework to facilitate large scale demand responsive transit. In accordance with one aspect of the framework, one or more trip requests from one or more commuter devices are received. A trip request indicates at least one start location and at least one end location. In addition, vehicle information is received from one or more available vehicles. The vehicle information indicates at least one current location of a vehicle. An adaptive route for the vehicle may be planned based on the one or more trip requests and the vehicle information. Update information of the adaptive route may be communicated to the vehicle and the one or more commuter devices.

19 Claims, 5 Drawing Sheets

LARGE SCALE DEMAND RESPONSIVE TRANSIT FRAMEWORK

TECHNICAL FIELD

The present disclosure relates generally to computer systems, and more specifically, to a framework for facilitating large scale demand responsive vehicle transit.

BACKGROUND

Most mega cities face challenges related to traffic congestion, and many solutions have been proposed by a wide range of stakeholders, ranging from the government, academia, public, and industry players (e.g., public transit operators). Such solutions typically focus on either demand management or supply expansion. For example, the government may propose policy changes in road pricing, parking restrictions or pedestrian oriented designs to manage demand for transportation. The government may also provide incentive schemes to encourage flexible work schedules, home-offices, and/or the provision of eco-friendly alternatives. The government may also implement adaptive traffic light controls to manage supply of transportation. However, such solutions often require extensive and fundamental changes in the existing transport infrastructure and policies, which can be quite costly and difficult to implement and enforce.

In recent years, there has been a shift in paradigm from policy enforcement to individual empowerment. For instance, individuals may choose to work from home, share car rides with others (i.e. car pool), or use social media to obtain traffic reports. However, such individual efforts are generally ad-hoc and are not synchronized or coordinated. They are typically not widespread enough to bring about substantial changes to ease traffic congestion problems.

Therefore, there is a need for an improved framework that addresses the above-mentioned challenges.

SUMMARY

A framework for facilitating large scale demand responsive transit is described herein. In accordance with one aspect of the framework, one or more trip requests from one or more commuter devices are received. A trip request indicates at least one start location and at least one end location. In addition, vehicle information is received from one or more available vehicles. The vehicle information indicates at least one current location of a vehicle. An adaptive route for the vehicle may be planned based on the one or more trip requests and the vehicle information. Update information of the adaptive route may be communicated to the vehicle and the one or more commuter devices.

In accordance with another aspect of the framework, one or more trip requests from one or more commuter devices are received. A trip request indicates at least one start location and at least one end location. In addition, vehicle information is received from one or more available vehicles. The vehicle information indicates at least one current location of a vehicle. An adaptive route for the vehicle may be planned based on the one or more trip requests and the vehicle information. An evaluation score of the adaptive route may be generated based on one or more score factors. If the one or more score factors meet all pre-defined constraints, update information of the adaptive route is communicated to the vehicle and the one or more commuter devices.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein.

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of the present framework and methods, and to thereby better explain the present framework and methods. Furthermore, for ease of understanding, certain method steps are delineated as separate steps; however, these separately delineated steps should not be construed as necessarily order dependent in their performance.

A framework for facilitating large scale demand responsive transit (DRT) is described herein. DRT is a user-oriented form of public transport that offers flexible routing and scheduling of vehicles (e.g., buses, vans, cars, etc.) operating in a shared ride mode between pick-up and drop-off locations according to the passengers' needs. A DRT vehicle can depart from its regular schedule to pick-up or drop-off passengers. DRT is traditionally found in rural communities or areas with low commuter demand where built-up residential areas are scattered, and a regular bus service may not be economically viable. There are also examples of DRT being applied in heavily populated cities. For example, the mini-bus in Hong Kong provides a flexible and well-received transport service to passengers within a certain localized area. The drawbacks of DRT become more obvious when the size of the operating area grows in the absence of real-time planning capabilities and infrastructure support. Failures in coordination, optimization and infrastructure support can easily push up operational cost and cause the quality of service to deteriorate.

Figure 1:
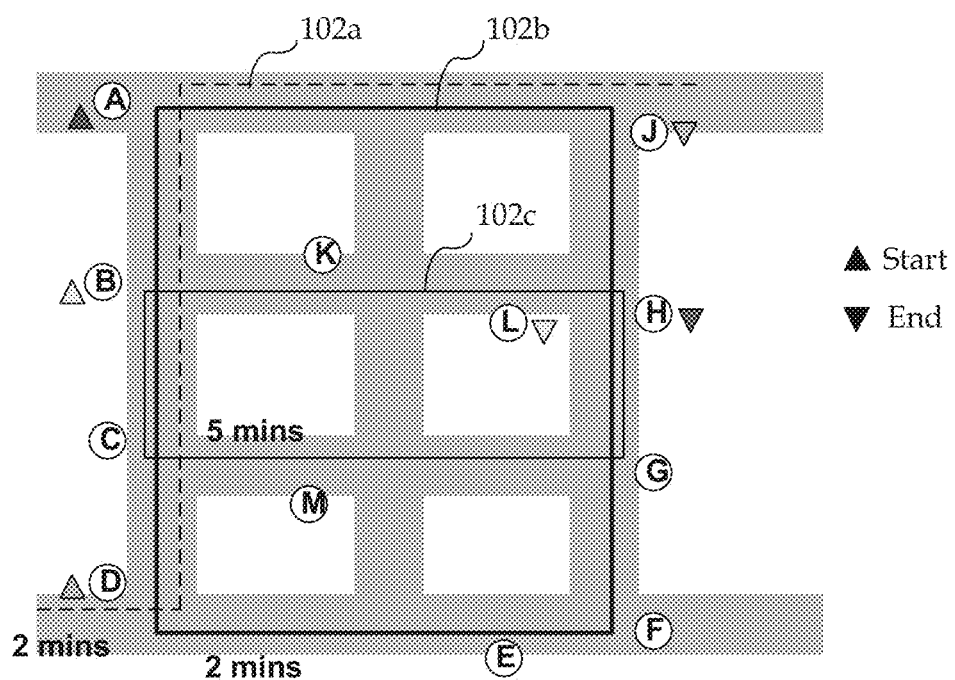
FIG. 1 illustrates an example of a fixed-route bus transit.

Traditional fixed-route transit (FRT) is more common in larger cities. Compared to DRT, FRT is typically easier to operate, manage and conform to. FIG. 1 illustrates an example of a fixed-route bus transit. The map 100 shows several bus-stops A-M and pick-up/drop-off locations (i.e. Start/End locations) of commuters along the roads. The bus routes 102a-c are fixed, and the operator dispatches the buses in accordance with a fixed schedule.

Such a model is far from being optimal. For instance, there may be multiple services with at least partially overlapping routes. Referring to FIG. 1, for example, a commuter may be waiting at bus stop B for a bus going along route 102c to bus stop L. The same commuter may see other buses from routes 102a and 102b arriving, since they are being dispatched more frequently (e.g., 2 min intervals). However, the commuter is unable to utilize these services as they are not going to his or her desired destination. Such prolonged waiting and frequent attention to irrelevant bus arrivals will easily cause the commuter to be impatient and frustrated. From the system standpoint, this is also a waste of resources resulting from mismatched oversupply to existing demand DRT is clearly better than FRT in maximizing vehicle utilization and road usage, and improving point-to-point convenience for commuters.

One aspect of the present framework applies DRT in a large scale with the assistance of real-time big data processing to improve public transit systems. More particularly, the present DRT framework removes operational barriers by providing real-time trip planning capabilities and an integrated commuter dashboard for receiving and responding to transportation requests from commuters. The present DRT framework advantageously provides more convenience to commuters, enhances the quality of transportation service, saves operation cost and encourages more people to use public transportation. Compared to traditional solutions, the present framework does not require any fundamental changes in existing hardware infrastructure, nor is it another user-centric data consumption application. Rather, it provides a well-coordinated DRT system that is closer to an optimum solution for the traffic congestion problem in general. The framework may be built using existing bus stops or public transit infrastructure, and focuses on real-time planning and large scale operation of DRT with the support of big data. These and other advantages and features will be described in more detailed herein.

It should be appreciated that the framework described herein may be implemented as a method, a computer-controlled apparatus, a computer process, a computing system, or as an article of manufacture such as a computer-usable medium. These and various other features will be apparent from the following description.

Figure 2:
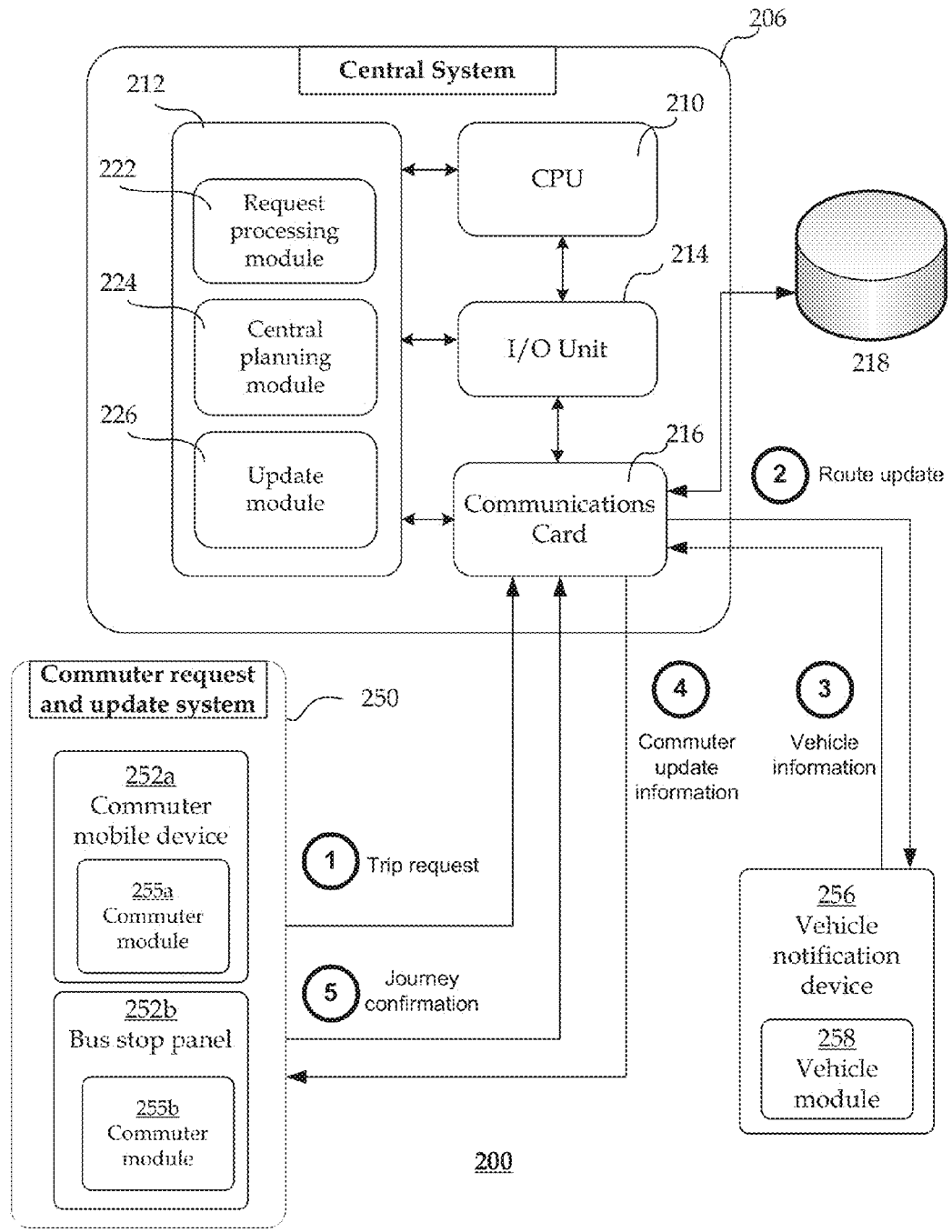
FIG. 2 is a block diagram illustrating an exemplary architecture.

FIG. 2 is a block diagram illustrating an exemplary architecture 200 that may be used to implement the framework described herein. Generally, architecture 200 may include a central computer system 206, a commuter request and update system 250 and a vehicle notification device 256. It should be appreciated that the present framework is described in the context of bus transit for the purposes of illustration only. The present framework may also be applied to other forms of public transit or vehicles that can operate in a shared ride mode, such as vans, cars, ships, water taxis, and so forth.

Central computer system 206 can be any type of computing device capable of responding to and executing instructions in a defined manner, such as a workstation, a server, a portable laptop computer, another portable device, a mini-computer, a mainframe computer, a storage system, a dedicated digital appliance, a device, a component, other equipment, or some combination of these. Central computer system 206 may include a central processing unit (CPU) 210, an input/output (I/O) unit 214, a memory module 212 and a communications card or device 216 (e.g., modem and/or network adapter) for exchanging data with a network (e.g., local area network (LAN) or a wide area network (WAN)). It should be appreciated that the different components and sub-components of the computer system 206 may be located on different machines or systems.

Central computer system 206 may be communicatively coupled to one or more other computer systems or devices via the network. For instance, computer system 206 may further be communicatively coupled to one or more data repositories 218. Data repository 218 may be, for example, any database (e.g., relational database, in-memory database, etc.), an entity (e.g., set of related records), or a data set included in a database. In some implementations, data repository 218 serves to store trip request data, bus location data, and so forth. Assuming that the average number of daily bus rides is around 3 million in a relatively large city, the accumulated data volume is estimated to be around 30 gigabytes per day. As such, the data repository 218 may include a high efficiency database with low seek time to enable the central system 206 to perform substantially in real time.

In some implementations, an in-memory database is implemented as the data repository 218. In-memory databases allow seamless access to and propagation of high volumes of data in real time. Parallel processing may further be achieved by using a multicore processor 210 in conjunction with the in-memory database 218. The in-memory database 218 is a database management system that relies primarily on a system's main memory for efficient computer data storage. More particularly, the data in the in-memory database resides in volatile memory and is not persistently stored on a hard drive, thereby allowing the data to be instantly accessed and scanned at a speed of several megabytes per millisecond.

Central computer system 206 may act as a server and operate in a networked environment using logical connections to the commuter request and update system 250 and the vehicle notification device 256. Commuter request and update system 250 includes a set of commuter devices 252a-b that serve as user interfaces to receive requests for transportation and provide transportation updates and information. In some implementations, such commuter devices include commuter mobile devices (e.g., smart phone, tablet computer, laptop communication device, etc.) 252a and bus stop panels 252b.

Figure 3:
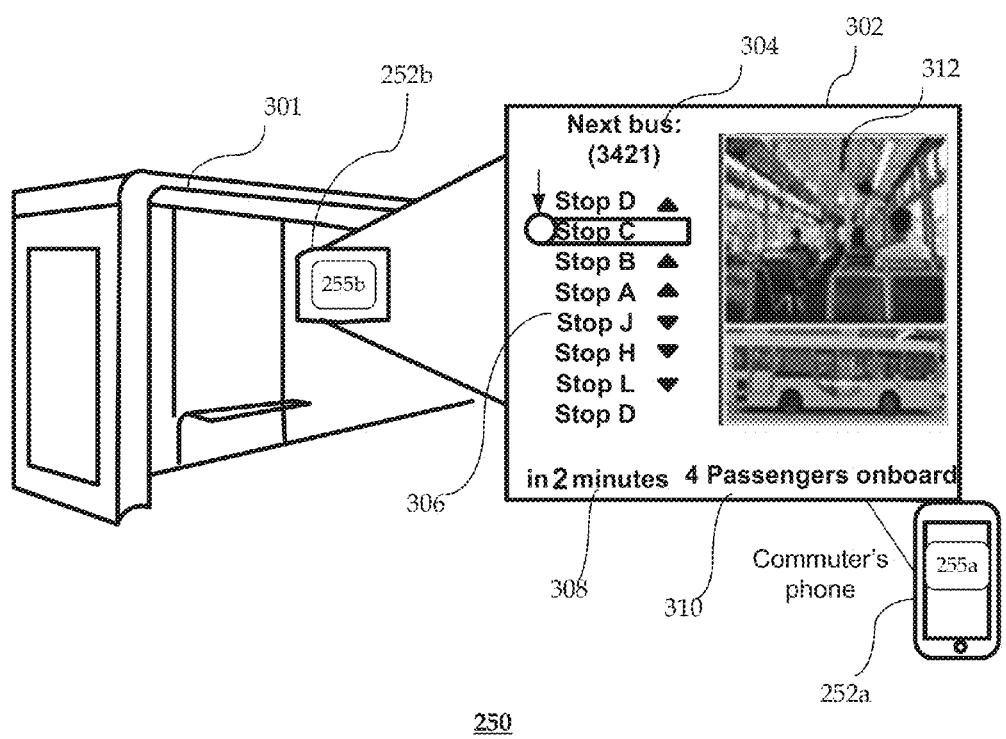
FIG. 3 shows an exemplary commuter request and update system.

FIG. 3 shows an exemplary commuter request and update system 250. The commuter mobile device 252a may be handheld or carried by a commuter, while the bus stop panel 252b may be physically installed at a bus stop 301 or any other designated pick-up location. The commuter mobile device 252a and bus stop panel 252b may each include components similar to a computer system, such as an input device for receiving user input (e.g., touch screen, keypad, speech recognition component, etc.), an output device for displaying a dashboard 302, a communications card, memory for storing a commuter module 255a-b, a processor for executing the commuter module 255a-b, and so forth.

In some implementations, the commuter modules 255a-b communicate with the central computer system 206 to send requests for transportation, and to send and receive updates on transportation information. In addition, the commuter modules 255a-b may render the dashboard 302 that displays vehicle update information of the next vehicle that fits the commuter's trip request, such as the identifier 304, route information 306 (e.g., start and end locations along its route), estimated arrival time 308, number of passengers on-board 310, exterior/interior images 312, and so forth. In some implementations, the vehicle is identified by a unique identification number 304, instead of a line number or name for a fleet of buses. The dashboard 302 may present this identification number 304, along with the exterior and/or interior images 312 of the vehicle to help the commuter identify the vehicle when it approaches the pick-up location.

Referring back to FIG. 2, memory module 212 of the central computer system 206 may be any form of non-transitory computer-readable media, including, but not limited to, dynamic random access memory (DRAM), static random access memory (SRAM), Erasable Programmable Read-Only Memory (EPROM), Electrically Erasable Programmable Read-Only Memory (EEPROM), flash memory devices, magnetic disks, internal hard disks, removable disks, magneto-optical disks, Compact Disc Read-Only Memory (CD-ROM), any other volatile or non-volatile memory, or a combination thereof. Memory module 212 serves to store machine-executable instructions, data, and various software components for implementing the techniques described herein, all of which may be processed by CPU 210. As such, the computer system 206 is a general-purpose computer system that becomes a specific-purpose computer system when executing the machine-executable instructions. Alternatively, the various techniques described herein may be implemented as part of a software product. Each computer program may be implemented in a high-level procedural or object-oriented programming language (e.g., C, C++, Java, JavaScript, Advanced Business Application Programming (ABAP™) from SAP® AG, Structured Query Language (SQL), etc.), or in assembly or machine language if desired. The language may be a compiled or interpreted language. The machine-executable instructions are not intended to be limited to any particular programming language and implementation thereof. It will be appreciated that a variety of programming languages and coding thereof may be used to implement the teachings of the disclosure contained herein.

In some implementations, memory module 212 of the central computer system 206 includes a request processing module 222, a central planning module 224 and an update module 226. Request processing module 222 may include a set of function modules or programs designed to collect incoming requests (1) for transportation from commuters via the commuter modules 255a-b implemented in commuter devices 252a-b. The request processing module 222 may aggregate the incoming requests from different commuter mobile devices 252a and/or bus stop panels 252b before sending the request data to the central planning module 224.

The central planning module 224 may include a set of function models or programs designed to use the request data to dynamically determine an adaptive dispatch route for the next bus or vehicle. The dispatch route may then be communicated to the update module 226, which then sends route updates (2) to the respective vehicle notification device 256 to notify the driver where the next destination should be.

The vehicle notification device 256 may be physically installed on-board the bus and serve as a communication interface between the bus driver and the central planning module 224. The vehicle notification device 256 may include components similar to a computer system, such as an input device for receiving user input (e.g., touch screen, keypad, speech recognition component, etc.), an output device for displaying a user interface, a communications card, memory for storing a vehicle module 258, a processor for executing the vehicle module 258, and so forth. The vehicle notification device 256 may further include a telematics device capable of collecting substantially real-time vehicle information, such as current location of the vehicle, number of passengers on-board (i.e. passenger load), etc. Exemplary telematics devices include, but are not limited to, global positioning systems (GPS), electronic, electromechanical, electromagnetic and/or electromechanical sensors, and so forth. The vehicle notification device 256 may stream the real-time vehicle information to the central computer system 206 at regular time intervals (e.g., 10 seconds). In some implementations, the vehicle information is stored in data repository 218. The vehicle information may be stored for a maximum time period equal to the length of the vehicle trip.

More particularly, the vehicle module 258 may receive route updates (2) from the central planning module 224 and provide real-time vehicle information (3) to update the central planning module 224. Such real-time vehicle information (3) may include, for example, bus identifier (ID), current location, current route, current capacity or passenger load, current time table, and/or other information to update the central planning module 224. Such real-time vehicle information may be streamed to the central planning module 224 via, for example, a 3G network or any other types of suitable network.

The central planning module 224 determines an adaptive route based on the trip requests and the vehicle information. As the vehicle travels further and additional trip requests (1) are collected, the vehicle route may be changed in response to the additional requests and the central computer system 206 may send further route updates of the changed route to the vehicle module 258. Accordingly, each individual bus may operate dynamically on the trip-level, depending on the demand of the commuters.

In addition, constraints may be pre-defined for the bus or vehicle. The adaptive route generated by the central planning module 224 satisfies these pre-defined constraints. Different constraints may be pre-defined for each individual bus or vehicle and/or each individual trip. Constraints may be either static or dynamic. A static constraint expresses event-independent properties, while a dynamic constraint expresses conditions over a sequence of events. Exemplary static constraints include, but are not limited to, maximum travel distance, zones, time and/or mileage per trip or per day. Exemplary dynamic constraints include, but are not limited to, avoiding certain roads on certain days (or time) based on detection of ad hoc events, such as traffic accidents, police road blocks, road closures due to construction, etc. The constraint data may be stored in, for example, memory module 212 or data repository 218.

The update module 226 of the central computer system 206 may send commuter update information (4) to the commuter modules 255a-b. The commuter update information (4) may include, for example, the real-time location of the bus, passenger load of the bus, route updates, time table, and so forth. When a commuter boards or alights from a bus, the commuter module 255a associated with the commuter may automatically send a journey confirmation (5) to the central computer system 206 to update it of the commuter's status.

Figure 4:
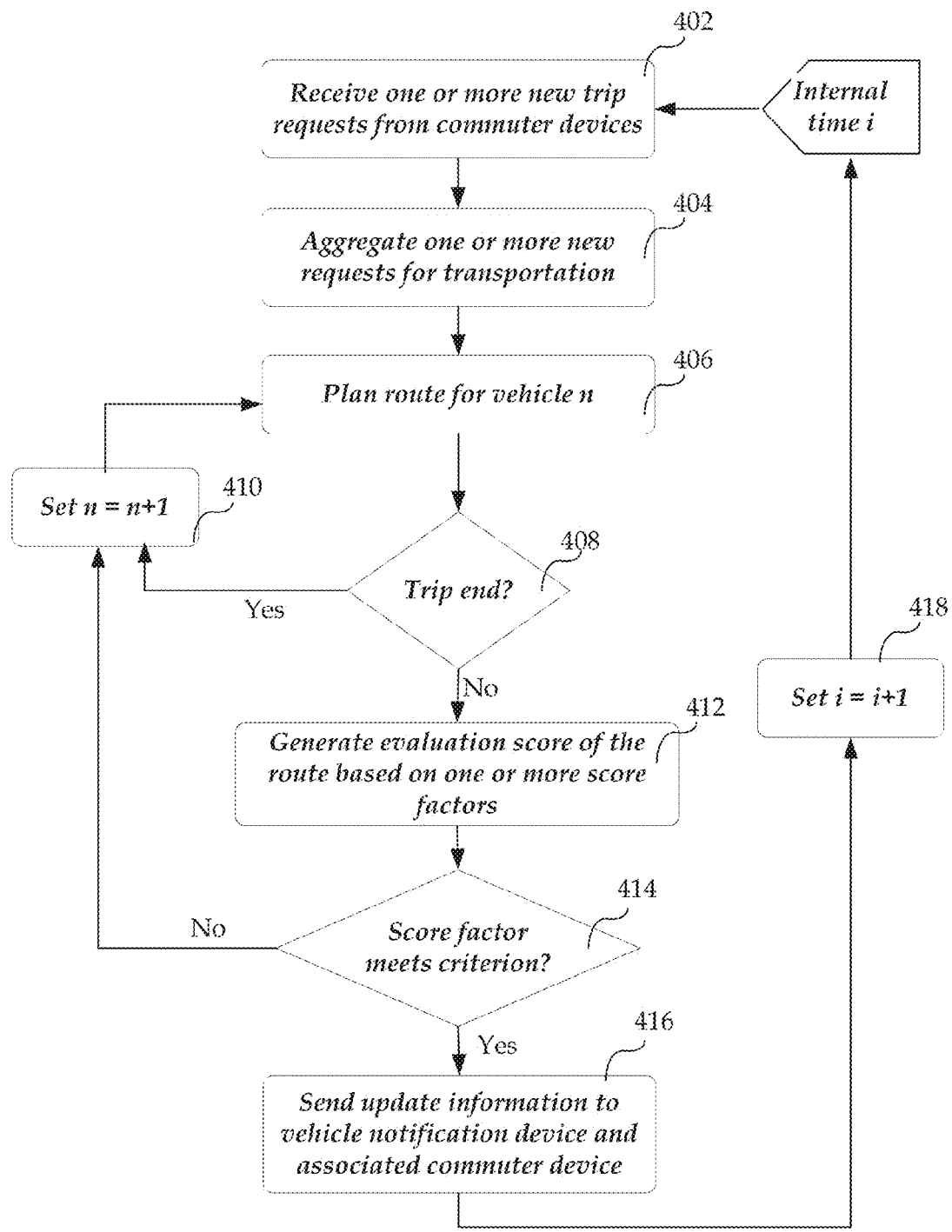
FIG. 4 shows an exemplary method of planning demand responsive transit.

FIG. 4 shows an exemplary method 400 of facilitating large scale demand responsive transit. The process 400 may be performed automatically or semi-automatically by the central computer system 206, as previously described with reference to FIG. 2. It should be noted that in the following discussion, reference will be made, using like numerals, to the features described in FIG. 2.

At 402, the request processing module 222 receives one or more new requests for transportation (i.e. trip requests) from one or more commuter devices 252a-b (e.g., commuter mobile device, bus stop panel, etc.) at internal time i. Each trip request may indicate the start location (i.e. pick-up point), end location (i.e. drop-off point), time stamp of request submission, and any other relevant information. The request processing module 222 may collect the trip requests at regular time intervals (e.g., 10 seconds).

At 404, the request processing module 222 aggregates the trip requests and organizes them into formatted request data before routing it to the central planning module 224. For instance, the request data may be formatted using the following schema: {trip request time stamp, requestor ID, request ID, start location, end location, preference comment (e.g., "wheelchair access", "seat only", "air-con", etc.)}. The trip request data may also be stored in the data repository 218 for future retrieval. The trip request data may be used to, for example, perform longer term demand prediction, improvement studies, and so forth.

At 406, the central planning module 224 generates an adaptive route for an available vehicle n. In some implementations, available vehicles are first sorted by their travel distances (e.g., in ascending order) with respect to each request r and processed according to the sorted order. The travel distance may be computed by determining the distance of planned route between the start location of the request r and the current location of each vehicle. Other metrics may also be used to sort the vehicles. The vehicle n with the shortest travel distance may be processed first at step 406, followed by the vehicle with the next shortest travel distance.

The adaptive route may be determined using, for example, a minimum accumulated travel distance (ATD) technique. Other techniques are also useful. The minimum ATD technique finds the optimum route based on the shortest ATD of the vehicle n, subject to constraint settings. More particularly, there are two possible routes (or next locations) for the vehicle n: (1) end location of request r; and (2) planned route location. To choose the more optimal route, the central planning module 224 may compare a first ATD in the case where the vehicle n travels from its current location to the start location specified in request r and a second ATD in the case where the vehicle n travels from its current location to a planned route start location. The ATD is the actual travel distance of the vehicle n. In the case where the vehicle n travels from its current location to the start location specified in request r, the ATD may be computed as follows:

$$\text{ATD} = \text{Travel distance from current location to start location of request } r + \text{Travel distance of remaining planned route of confirmed but unfinished requests}(1,2,\ldots,r-1) \quad (6)$$

Figure 5:
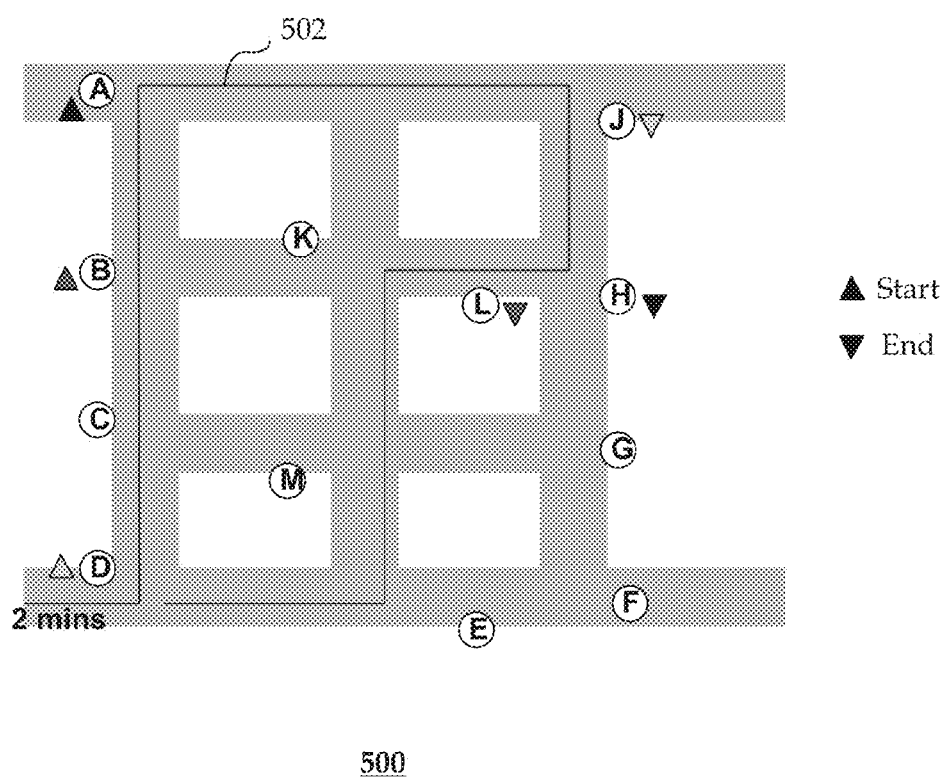
FIG. 5 illustrates an example of a demand responsive transit.

FIG. 5 illustrates an example of a DRT. The map 500 shows an exemplary adaptive route 502 generated by the central planning module 224. The adaptive route 502 has several start (i.e. pick-up) and end (i.e. drop-off) locations for different commuters who have submitted different trip requests. The adaptive route 502 may further change as the bus travels further and the central computer system 206 collects more incoming trip requests from commuters.

At 408, the central planning module 224 determines if the trip has ended for the current vehicle n. The trip ends when, for example, the current vehicle n has completed a pre-defined number of stops or has traveled a pre-defined accumulated travel distance for the day. Other types of constraints may also be set for each individual vehicle.

If the central planning module 224 determines that the trip has ended, at 410, the current vehicle n is set to the next available vehicle n+1 of the operator's fleet and steps 406 and 408 are repeated for the next available vehicle n+1. If there is only one vehicle available, it will automatically become the best choice for the next vehicle n+1. In cases where all the vehicles are out of service or have been screened out due to constraint or criteria settings, the process 400 will stop receiving any incoming trip requests and inform the affected commuters.

If the central planning module 224 determines that the trip has not ended for the current vehicle n, at 412, the central planning module 224 generates an evaluation score of the adaptive route based on one or more score factors. The score factors may include, for instance, the accumulated travel distance of the vehicle n, accumulated travel time of the vehicle n, accumulated waiting time of the passengers of the vehicle n, and so forth.

In some implementations, the evaluation score is determined based on a vector of the score factor ranks. An exemplary score vector may be defined as follows: {rank of accumulated travel distance, rank of accumulated travel time, rank of accumulated or average commuter waiting time}. The final evaluation score may be computed by aggregating the score factor ranks. It may also be possible to include weighting factors in computing the final evaluation score, as follows:

$$\text{Evaluation score} = (\text{Rank\_1} * \text{Weight\_1}) + (\text{Rank\_2} * \text{Weight\_2}) + \ldots + (\text{Rank\_x} * \text{Weight\_x}) \quad (7)$$

where Rank_1, Rank_2, ..., Rank_x are the score factor ranks, Weight_1, Weight_2, ..., Weight_x are the weighting factors, and x is an integer greater than 0.

If the value of the score vector is, for instance, {1, 2, 3}, it means that for this specific request, the vehicle n has the least travel distance (or mileage), the second least travel time (e.g., due to possible traffic congestion at certain parts of the route), and the third least commuter waiting time (e.g., due to early requests scheduled to pick up later in sequence). The final evaluation score may be 1+2+3=6 if no weighting factors are used. It is also possible to include weighting factors in computing the final evaluation score. The vehicle with the least final evaluation score may be the best selection.

At 414, the central planning module 224 determines if the evaluation score factor meets a pre-defined criterion. For instance, if a criterion regarding "average waiting time" has been pre-defined as, for example, less than 10 minutes, only those vehicles with short "average waiting time" of less than 10 minutes will be considered for dispatch. If any evaluation score factor does not meet the pre-determined criterion, at 410, the current vehicle n is set to the next available vehicle n+1 of the operator's fleet and steps 406, 408 and 412 are repeated.

If the evaluation score does meet the pre-defined criterion, at 416, the update module 226 sends a route update to the vehicle notification device 256 associated with vehicle n to notify the driver of the suggested adaptive route and let the driver know which location (e.g., bus top) to travel to next. The update module 226 may further send commuter update information to the commuter devices 252*a*-*b* to, for example, notify the commuter of the estimated arrival time of the vehicle n, the number of passengers on-board the vehicle n, images of the interior and/or exterior of vehicle n, route information associated with vehicle n, and/or other commuter update information.

At 418, the internal time i of the central computer system 206 is set to the next time i+1 and the process 400 repeats to process the next set of trip requests.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A computer-implemented method of facilitating large scale demand responsive transit, comprising:
   receiving one or more trip requests from one or more commuter devices, wherein a trip request indicates at least one start location and at least one end location;
   receiving vehicle information from one or more vehicles, wherein the vehicle information indicates at least one current location of a vehicle;
   planning, by a processor, an adaptive route for the vehicle based on the one or more trip requests, the vehicle information and at least one dynamic constraint that includes road avoidance in response to detection of an event;

generating, by the processor, an evaluation score of the adaptive route, wherein the evaluation score is based on one or more score factors; and if the one or more score factors meet pre-defined criteria, communicating update information of the adaptive route to the vehicle and the one or more commuter devices.

2. A computer-implemented method of facilitating large scale demand responsive transit, comprising:

receiving one or more trip requests from one or more commuter devices, wherein a trip request indicates at least one start location and at least one end location;

receiving vehicle information from one or more available vehicles, wherein the vehicle information indicates at least one current location of a vehicle;

planning, by a processor, an adaptive route for the vehicle based on the one or more trip requests and the vehicle information; and communicating, by the processor, update information of the adaptive route to the vehicle and the one or more commuter devices, wherein the update information comprises an identifier of the vehicle, the adaptive route information, estimated arrival time of the vehicle, number of passengers on-board the vehicle, an interior image of the vehicle, an exterior image of the vehicle, or a combination thereof.

3. The method of claim 2 further comprising presenting, via a dashboard rendered at the one or more commuter devices, the update information.

4. The method of claim 2 wherein receiving the one or more trip requests comprises collecting the one or more trip requests from the one or more commuter devices at regular time intervals.

5. The method of claim 2 wherein receiving the vehicle information from the one or more vehicles comprises receiving, at regular time intervals, the vehicle information from one or more telematics devices installed in the one or more vehicles.

6. The method of claim 5 wherein the vehicle information further comprises number of passengers on-board the vehicle.

7. The method of claim 2 further comprising:

changing the adaptive route in response to receiving one or more additional trip requests; and communicating update information of the changed route to the vehicle and the one or more commuter devices.

8. The method of claim 2 wherein planning the adaptive route for the vehicle further comprises planning the adaptive route based on one or more pre-defined constraints.

9. The method of claim 8 wherein the one or more pre-defined constraints comprise at least one static constraint.

10. The method of claim 8 wherein the one or more pre-defined constraints comprise at least one dynamic constraint.

11. The method of claim 2 further comprising aggregating the one or more trip requests into formatted request data and storing the formatted request data for future retrieval.

12. The method of claim 2 further comprising sorting available vehicles by travel distances in ascending order and planning the adaptive route of the vehicles based on the order.

13. The method of claim 2 wherein planning the adaptive route for the vehicle comprises performing a minimum accumulated travel distance technique.

14. The method of claim 2 further comprising generating an evaluation score of the adaptive route based on one or more score factors.

15. The method of claim 14 wherein the one or more score factors comprise accumulated travel distance, accumulated travel time, accumulated commuter waiting time, average commuter waiting time, or a combination thereof.

16. The method of claim 14 further comprising:

if at least one of the one or more score factors does not meet a pre-defined criterion, planning another adaptive route for a next available vehicle based on the one or more trip requests and vehicle information of the next available vehicle.

17. A non-transitory computer-readable medium having stored thereon program code, the program code executable by a computer to:

receive one or more trip requests from one or more commuter devices, wherein a trip request indicates at least one start location and at least one end location;

receive vehicle information from one or more available vehicles, wherein the vehicle information indicates at least one current location of a vehicle;

plan an adaptive route for the vehicle based on the one or more trip requests, the vehicle information and at least one dynamic constraint that includes road avoidance in response to detection of an event; and communicate update information of the adaptive route to the vehicle and the one or more commuter devices.

18. A system for facilitating large scale demand responsive transit, comprising:

a non-transitory memory device for storing computer-readable program code; and a processor in communication with the memory device, the processor being operative with the computer-readable program code to perform the steps of receive one or more trip requests from one or more commuter devices, wherein a trip request indicates at least one start location and at least one end location;

receive vehicle information from one or more available vehicles, wherein the vehicle information indicates at least one current location of a vehicle;

plan an adaptive route for the vehicle based on the one or more trip requests and the vehicle information; and communicate update information of the adaptive route to the vehicle and the one or more commuter devices, wherein the update information comprises an identifier of the vehicle, the adaptive route information, estimated arrival time of the vehicle, number of passengers on-board the vehicle, an interior image of the vehicle, an exterior image of the vehicle, or a combination thereof.

19. The system of claim 18 wherein the one or more commuter devices comprise at least one mobile device or bus-stop panel.

* * * * *